(No Model.)
W. PRICE.
CORN PLANTER ATTACHMENT.
No. 403,369. Patented May 14, 1889.
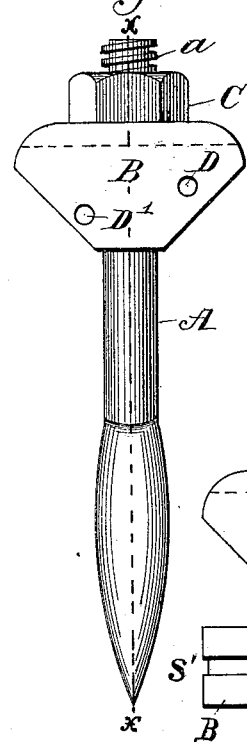
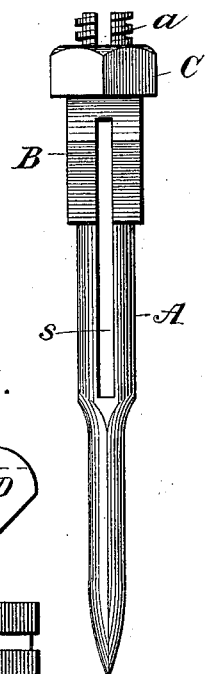
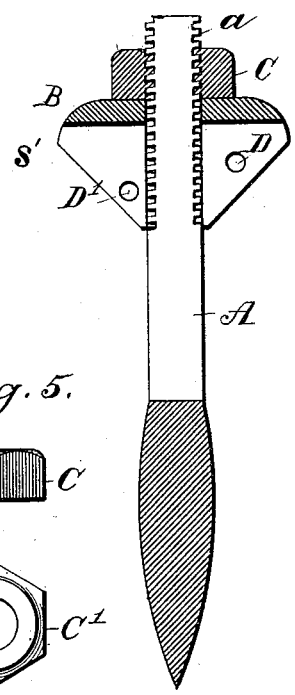
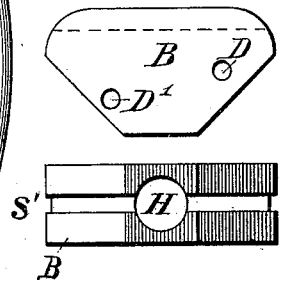
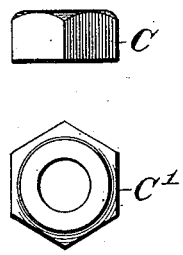
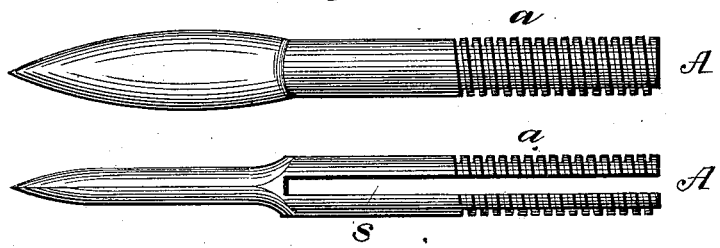
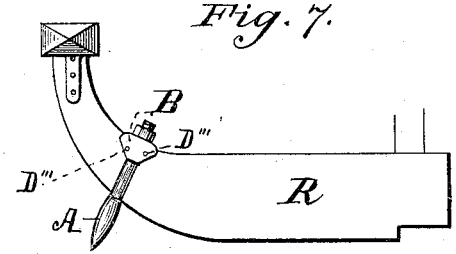
Witnesses:
Inventor:

UNITED STATES PATENT OFFICE.

WALTER PRICE, OF LYONS, NEBRASKA.

CORN-PLANTER ATTACHMENT.

SPECIFICATION forming part of Letters Patent No. 403,369, dated May 14, 1889.

Application filed October 22, 1888. Serial No. 288,870. (No model.)

*To all whom it may concern:*

Be it known that I, WALTER PRICE, of the town of Lyons, county of Burt, and State of Nebraska, have invented certain new and useful Improvements in Attachments to Corn-Planters; and I do hereby declare the following to be a full, clear, and exact description of the invention, such as will enable others skilled in the art to which it pertains to make and use the same.

My invention is a device adapted for attachment to all ordinary corn-planters, and has for its object the loosening of the earth in front of the planter-runners and the removal of stalks, weeds, clods, and the like from their paths. In the attainment of these ends uniformity in depth of planting and general perfection of work are secured; and, further, the operator is relieved from the necessity of watching the action of the planter.

In the accompanying drawings, to which this specification refers, Figure 1 is a side elevation of the complete device. Fig. 2 is a front elevation of the same. Fig. 3 is a section on the line $x\,x$, Fig. 1. Fig. 4 includes a side and a bottom view of a cap, hereinafter described. Fig. 5 shows in plan and in elevation a nut to be placed upon said cap. Fig. 6 shows the part A detached, (seen as in Figs. 1 and 2.) Fig. 7 shows the device in position upon a planter-runner.

As the devices upon the two planter-runners are identical, one only is described.

In the drawings, R is an ordinary corn-planter runner, and A is a preferably steel tooth rigidly secured to the front portion thereof. The upper end or shank of the tooth is axially slotted at S to receive the runner, and is screw-threaded at $a$.

B is a cap provided with a central perforation, H, for the tooth-shank, and having through its lower part a slot, S', adapted to register with the slot S when the cap is placed upon the shank. The cap is further provided with transverse apertures D D', to receive wooden or other pins, D''', which practically vary the inclination of the cap to the axial line of the tooth by varying the depth to which the edge of the runner can enter either end of the slot. Now if the slotted tooth be slipped over the runner from below, and if the cap be placed in position, as shown, with the nut screwed firmly down upon it, the whole will evidently be clamped in place and the angle of the tooth's inclination will depend upon the point chosen for its attachment to the runner and the form of the latter, provided that the pins D''' be not used. If the rear pin, D''', be inserted, this pin and the front edge of the cap will alone rest upon the runner, and when the nut is screwed down the tooth will necessarily be rearwardly inclined; but if the front pin alone be used, for like reasons the tooth will be thrown forward. As the cap may be reversed to bring either pin in front, this construction permits a considerable range within which the tooth may be set at almost any desired angle.

As shown, the tooth is solid below the slot, straight, and pointed; but without departing from my invention it may be made with its lower part of any desired form, according to the character of the work for which it is to be used, and evidently, whatever its form, it may be reversed when from wearing of its front side or from any other cause reversal may seem desirable.

What I claim is—

1. In a corn-planter attachment, the tooth A, having the slot S, for bestriding the runner R, in combination with the adjustable cap B, for securing the tooth thereto, substantially as set forth.

2. In a corn-planter attachment, the combination of the slotted tooth A and the cap B, whereby the tooth may be reversed when worn, substantially as described.

3. In a corn-planter attachment, the slotted tooth A, screw-threaded at the top, in combination with the cap B and nut C, whereby the tooth may be adjusted and reversed when desired, substantially as set forth.

In testimony whereof I have signed this specification in the presence of two subscribing witnesses.

WALTER PRICE.

Witnesses:
WALTER EVERETT,
JOHN F. PIPER.